Patented Nov. 29, 1949

2,490,001

UNITED STATES PATENT OFFICE 2,490,001

RUBBERLIKE CURED POLYESTER-POLY-AMIDES AND PROCESS OF PRODUCING SAME

David W. Jayne, Jr., Old Greenwich, Harold M. Day, Cos Cob, and Edward L. Kropa, Old Greenwich, Conn., assignors to American Cyanamid Company, New York, N. Y., a corporation of Maine No Drawing. Application December 18, 1946, Serial No. 717,087

6 Claims. (Cl. 260—77)

This invention relates to high molecular weight polyester-polyamides and more specifically, to co-condensation products of linear polyester-polyamides with glycol esters.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

Linear polyamides of high molecular weight such as the well-known nylon may be prepared from aminocarboxylic acids or from polyamines and dicarboxylic acids and are described, for example, in Patents Nos. 2,071,250, 2,130,523 and others.

In our copending applications, Serial Nos. 717,089 and 717,090 filed Dec. 18, 1946, leather-like cross-linked polyester-polyamides obtained by bringing about reaction between a polyfunctional compound and a linear polyester-polyamide derived from a primary straight-chain monoalkylolamine and a saturated dicarboxylic acid are described and claimed. These leather-like materials can be readily cold-drawn or calendered, and they can be molded under heat and pressure.

It is an object of the present invention to prepare derivatives of linear polyester-polyamides obtained by reaction of dicarboxylic acids with monoalkylolamines, said derivatives being rubber-like materials.

It is another object of the present invention to bring about reaction between an ester of an unsaturated acid and a linear polyester-polyamide to effect cross-linking of the latter.

Another object of the present invention is the preparation of a high molecular weight cross-linked polyester-polyamide which can be milled, like rubber, with pigments and curing agents and then cured in a rubber mold under heat and pressure to give a vulcanized material with rubber-like properties.

A still further object of the present invention is to provide a process for producing resins which can be cured by heating in the presence of an organic peroxide catalyst to produce a rubber-like material.

These and other objects are attained by bringing about reaction between substantially equivalent molar proportions of monoalkylolamine and saturated aliphatic dicarboxylic acid which does not form an anhydride upon heating, and bringing about reaction between the product obtained and a glycol acid ester of an alpha,beta-unsaturated aliphatic dicarboxylic acid, the molar ratio of saturated acid or monoalkylolamine to glycol acid ester being from about 1:0.15 to about 1:0.3. The reaction product is then milled with pigment, other filler if desired, and peroxide curing catalyst, and cured by heating.

The invention will be described in greater detail in conjunction with the following specific examples in which the proportions are given in parts by weight. It should be understood that the examples are merely illustrative, and it is not intended that the scope of the invention be limited to the details therein set forth.

Example 1

205 parts of sebacic acid (1.0 mol)
89 parts of 2-amino-1-butanol (1.0 mol)
40 parts of ethylene glycol acid maleate (0.25 mol)

The sebacic acid and 2-amino-1-butanol are heated in a vessel fitted with a mechanical agitator at 200° C. for 2 hours while maintaining an atmosphere of carbon dioxide. The ethylene glycol maleate is then added and heating under the carbon dioxide atmosphere continued for 3 hours.

The resin is milled with a pigment and with 4% by weight of the resin of lauroyl peroxide until both pigment and peroxide are thoroughly dispersed in the resin. The milled stock is then subjected, in a single cavity stainless steel mold, to 500 lbs./in.² pressure at 120° C. for 15 minutes. A sheet of rubbery material having a tensile strength of 825 p. s. i. and a 315% elongation at break is obtained.

Example 2

205 parts of sebacic acid (1.0 mol)
31.1 parts of 2-amino-1-butanol (0.35 mol)
39.7 parts of monoethanolamine (0.65 mol)
64 parts of ethylene glycol acid maleate (0.4 mol)

The sebacic acid, 2-amino-1-butanol and monoethanolamine are maintained at 200° C. under a carbon dioxide atmosphere for ¾ hour. The maleate is added and heating continued for one hour.

The resin is milled with Mapico Red No. 297, an iron oxide pigment, and with 4% by weight of the resin of lauroyl peroxide, and the milled stock is subjected to a temperature of 90° C. and a pressure of 500 lbs./in.² for 15 minutes in a flash mold. A rubbery product is obtained.

Example 3

210 parts of sebacic acid (1.04 mols)
75 parts of N-methyl monoethanolamine (1.0 mol)
40 parts of ethylene glycol acid maleate (0.25 mol)

The sebacic acid and N-methyl monoethanolamine are heated to 200° C. under an atmosphere of carbon dioxide and maintained at that temperature for 2 hours. The ethylene glycol acid maleate is added and heating continued for 6 hours.

The sticky product obtained is milled with ferric oxide and with 3% by weight of the resin of lauroyl peroxide and molded as in Examples 1 and 2. The cured sheet is rubbery and extremely lively.

Example 4

Example 3 is repeated using an equimolar mixture of N-methyl monoethanolamine and monoethanolamine in place of all N-methyl monoethanolamine. A good rubbery sheet having a tensile strength of 660 p. s. i., an elongation at break of 300 and a Shore hardness of 68 is obtained.

Example 5

1050 parts of sebacic acid (5.0 mols)
222.5 parts of N-ethyl monoethanolamine (2.5 mols)
152.5 parts of monoethanolamine (2.5 mols)
200 parts of ethylene glycol acid maleate (1.25 mols)

The sebacic acid, N-ethyl monoethanolamine and monoethanolamine are placed in a suitable vessel and heated to 200° C. under an atmosphere of carbon dioxide. The temperature is maintained at 200° C. for 2 hours, the ethylene glycol acid maleate is then added, and heating is continued for 2½ hours.

The resin obtained is milled with Mapico Red No. 297, an iron oxide pigment, and with 3% lauroyl peroxide as described in Example 1. A rubbery cured product having a tensile strength of 480 p. s. i., a 420% elongation at break and a Shore hardness of 50 is obtained.

Example 6

210 parts of sebacic acid (1.0 mol)
53.4 parts of N-ethyl monoethanolamine (0.6 mol)
24.4 parts of monoethanolamine (0.4 mol)
40 parts of ethylene glycol acid maleate (0.25 mol)

The procedure of Example 5 is followed with the following difference: the second heating period is 4 hours.

A rubbery cured product having a tensile strength of 545 p. s. i., a 320% elongation at break and a Shore hardness of 52 is obtained.

Example 7

205 parts of sebacic acid (1.0 mol)
89 parts of N-ethyl monoethanolamine (1.0 mol)
40 parts of ethylene glycol acid maleate (0.25 mol)

A mixture of the sebacic acid and N-ethyl monoethanolamine is brought to a temperature of 200° C. and, under an atmosphere of carbon dioxide, maintained at that temperature for 2 hours. The acid maleate is then added and heating continued for 3¼ hours.

The resin obtained is very sticky but it can be milled with pigment and with 3% by weight of resin of lauroyl peroxide as in Example 1. An elastic, rubbery product is obtained.

Example 8

101 parts of sebacic acid (0.5 mol)
37.5 parts of monoisopropanolamine (0.5 mol)
32 parts of ethylene glycol acid maleate (0.2 mol)

The procedure of Example 1 is followed with the following exceptions:

1. The second heating period is 2¼ hours.
2. The milled stock is molded at 90° C.

A sheet of rubbery material which has a tensile strength of 1260 p. s. i. and one of 960 p. s. i. at 100% elongation and 150% elongation at break is obtained.

Example 9

101 parts of sebacic acid (0.5 mol)
68.5 parts of N-phenyl monoethanolamine (0.5 mol)
20 parts of ethylene glycol acid maleate (0.125 mol)

The sebacic acid and N-phenyl monoethanolamine are heated in a suitable vessel at 200° C. for 2 hours while maintaining an atmosphere of carbon dioxide over the charge. The acid maleate is then added and heating continued for 23 hours.

50 parts of the cooled resin obtained in the manner described above are milled with 75 parts of Mapico Red No. 297, an iron oxide pigment, and with 1.5 parts of lauroyl peroxide and then cured at 500 lbs./in.$^2$ pressure at a temperature of 90° C. for 15 minutes. The rubbery material obtained has a tensile strength of 415 p. s. i. and one of 125 p. s. i. at 100% elongation and a 380% elongation at break.

Example 10

100 parts of sebacic acid (0.5 mol)
68.5 parts of N-phenyl monoethanolamine (0.5 mol)
19 parts of ethylene glycol acid maleate (0.125 mol)

The procedure of Example 9 is followed with the following exceptions:

1. The first heating period is 17 hours
2. The second heating period is 24 hours
3. The glycol maleate is heated at 200° C. and agitated with carbon dioxide for 10 minutes before use, giving a resin having an acid number of 162.

The rubbery product obtained has a tensile strength of 620 p. s. i. and one of 215 p. s. i. at 100% elongation and a 340% elongation at break.

Example 11

303 parts of sebacic acid (1.5 mols)
205.5 parts of N-phenyl monoethanolamine (1.5 mols)
78 parts of condensation product of diethylene glycol, fumaric acid and sebacic acid in a 6:5:1 molar ratio (acid No. 50) (0.375 mol)

The sebacic acid and N-phenyl monoethanolamine are charged in a vessel fitted with a mechanical agitator and connected to a vacuum pump. The batch is heated to 200° C. at atmospheric pressure with the evolution of steam, at which point the vessel is closed and its contents heated for one hour under vacuum at 200° C.

The vacuum is broken and the condensation product added, after which the mixture is heated at 200° C., again under vacuum, for 34½ hours.

The batch is then poured and allowed to cool. It is milled without cooling water on the rolls of the mill with 150% Mapico Red No. 297, an iron oxide pigment, and with 3% of lauroyl peroxide and cured at 90° C. and 500 lbs./in.$^2$ pressure for 15 minutes.

The cured sheet, which is rubbery and very lively and resilient, has a tensile strength of 700 p. s. i. and a 240% elongation at break.

Example 12

70.5 parts of sebacic acid (0.35 mol)
47.5 parts of N-phenyl monoethanolamine (0.35 mol)
8.32 parts of ethylene glycol acid maleate (0.053 mol)

The sebacic acid and N-phenyl monoethanolamine are charged in a stainless steel, closed-jacket resin kettle equipped with a propeller-type agitator and a distilling column connected to a vacuum pump. The kettle and its contents are heated by circulating liquid Dowtherm with agitation under atmospheric pressure to 200° C., evolved steam being condensed. Heating is continued for 2½ hours under vacuum after which the acid maleate is added and another 10½ hours of heating under vacuum is provided.

Milling and curing the cooled product according to the procedure of Example 11 results in a rubbery material which has a tensile strength of 520 p. s. i. and an elongation at break of 350%.

Example 13

64 parts of sebacic acid (0.32 mol)
43.5 parts of N-phenyl monoethanolamine (0.32 mol)
16.5 parts of the condensation product of diethylene glycol, fumaric acid and sebacic acid in a molar ratio of 6:5:1, having an acid number of about 50 (0.08 mol)
0.11 part of hydroquinone The procedure of Example 12 is followed with the following exceptions:

1. The first heating period is 3 hours
2. The second heating period is 18½ hours
3. The hydroquinone is added after 18 hours of the second heating period
4. 6% lauroyl peroxide is added as curing catalyst
5. Curing is effected by heating at 90° C. and 1000 lbs./in.² pressure for 10 minutes.

A lively, rubbery material is obtained. It has a modulus of 120 p. s. i. at 100% elongation, a tensile strength of 335 p. s. i., a 360% elongation at break, and a brittle point of −17° C. (0° F.).

Example 14

202 parts of sebacic acid (1.0 mol)
35.6 parts of 2-amino-1-butanol (0.4 mol)
36.6 parts of monoethanolamine (0.6 mol)
29 parts of ethylene glycol acid maleate (0.18 mol)

The sebacic acid, 2-amino-1-butanol and monoethanolamine are heated in a suitable vessel with agitation by means of carbon dioxide to 200° C., and the temperature is maintained for 18 hours. The acid maleate is then added and heating continued for 2 hours.

50 parts of the resin obtained are milled with 75 parts of Mapico Red No. 297, an iron oxide pigment, and then with 2 parts of lauroyl peroxide. The milled stock is molded at 120° C. and 500 lbs./in.² for 15 minutes.

The cured sheet obtained is leathery in appearance and has a tensile strength of 421 p. s. i., a 210% elongation at break and a Shore hardness of 75.

Example 15

210 parts of sebacic acid (1.0 mol)
31.1 parts of 2-amino-1-butanol (0.35 mol)
39.7 parts of monoethanolamine (0.65 mol)
40 parts of ethylene glycol acid maleate (0.25 mol)

The procedure of Example 14 is followed with the following exceptions:

1. The first heating period is ½ hour
2. The second heating period is 5 hours
3. The milled stock is molded at 90° C.

A product which is leathery in appearance and which has a tensile strength of 770 p. s. i., a 290% elongation at break and a Shore hardness of 75 is obtained.

Example 16

205 parts of sebacic acid (1.0 mol)
31.1 parts of 2-amino-1-butanol (0.35 mol)
39.7 parts of monoethanolamine (0.65 mol)
48 parts of ethylene glycol acid maleate (0.3 mol)

The procedure of Example 14 is followed with the following exceptions:

1. The first heating period is ¾ hour
2. The second heating period is 2½ hours
3. The milled stock is molded at 90° C.

A product which is leathery in appearance and which has a tensile strength of 515 p. s. i., a 310% elongation at break and a Shore hardness of 62 is obtained.

Example 17

205 parts of sebacic acid (1.0 mol)
26.7 parts of 2-amino-1-butanol (0.3 mol)
42.7 parts of monoethanolamine (0.7 mol)
40 parts of ethylene glycol acid maleate (0.25 mol)

The procedure of Example 14 is followed with the following changes:

1. The first heating period is 66 hours
2. The second heating period is 1 hour
3. 2% of lauroyl peroxide is added as the curing agent A product which is leathery in appearance and which has a tensile strength of 646 p. s. i. and a 200% elongation at break is obtained.

Example 18

205 parts of sebacic acid (1.0 mol)
22.2 parts of 2-amino-1-butanol (0.25 mol)
45.7 parts of monoethanolamine (0.75 mol)
40 parts of ethylene glycol acid maleate (0.25 mol)

The procedure of Example 14 is followed with the following exception:

1. The second heating period is 1½ hours

A leathery-appearing material having a tensile strength of 955 p. s. i., a 200% elongation at break and a Shore hardness of 92 is obtained.

Example 19

205 parts of sebacic acid (1.0 mol)
31.1 parts of 2-amino-1-butanol (0.35 mol)
39.7 parts of monoethanolamine (0.65 mol)
40 parts of ethylene glycol acid maleate (0.25 mol)

The procedure of Example 14 is followed with the following exceptions:

1. The first heating period is 2 hours
2. The second heating period is 1¾ hours
3. A third heating period, i. e., 1 hour in a vacuum oven at 160° C., after transferring the resin to a shallow tray is provided
4. The molding temperature is 90° C.

A sheet which has the appearance of leather and which has a tensile strength of 935 p. s. i., a 270% elongation at break and a Shore hardness of 68 is obtained.

If 50 parts of the resin, after the third heating period, are milled with 38 parts of calcium carbonate filler, 1 part of carbon black and 2 parts of lauroyl peroxide and then processed in the usual manner, a black sheet having the appearance of leather is obtained.

Milling of 50 parts of the resin with 38 parts of calcium carbonate filler, 6 parts of Mapico Red No. 297, an iron oxide pigment, and 2 parts of lauroyl peroxide prior to molding produces an orange-red sheet which has the appearance of leather.

Similarly, 50 parts of resin are milled with 38 parts of an olive drab coloring material and with 2 parts of lauroyl peroxide and then molded to give an olive drab sheet having the appearance of leather.

Example 20

205 parts of sebacic acid (1.0 mol)
31.1 parts of 2-amino-1-butanol (0.35 mol)
39.7 parts of monoethanolamine (0.65 mol)
43 parts of propylene glycol acid maleate (0.25 mol)

The procedure of Example 14 is followed except:

1. The first heating period is 2 hours
2. The second heating period is 2¼ hours
3. A third heating period of ½ hour in a vacuum oven at 160° C., after transferring the resin to a shallow tray, is provided
4. The molding is carried out at 90° C.

A sheet resembling leather in appearance and having a tensile strength of 835 p. s. i. and a 250% elongation at break is obtained.

Example 21

205 parts of sebacic acid (1.0 mol)
31.1 parts of 2-amino-1-butanol (0.35 mol)
39.7 parts of monoethanolamine (0.65 mol)
51 parts of diethylene glycol acid maleate (0.25 mol)

The procedure of Example 14 with the modifications enumerated in Example 19 is followed and a sheet resembling leather in appearance and having a tensile strength of 630 p. s. i. and a 245% elongation at break is obtained.

Example 22

205 parts of sebacic acid (1.0 mol)
31.1 parts of N-ethyl monoethanolamine (0.35 mol)
39.7 parts of monoethanolamine (0.65 mol)
40 parts of ethylene glycol acid maleate (0.25 mol)

The procedure of Example 14 is followed with the following modifications:

1. The first heating period is 2 hours
2. The second heating period is 3 hours
3. 1.5 parts of lauroyl peroxide are added as the curing catalyst A sheet resembling leather and having a tensile strength of 650 p. s. i. and a 190% elongation at break is obtained.

Example 23

210 parts of sebacic acid (1.0 mol)
35.6 parts of N-ethyl monoethanolamine (0.4 mol)
36.6 parts of monoethanolamine (0.6 mol)
40 parts of ethylene glycol acid maleate (0.25 mol)

The procedure of Example 14 is followed with the following exceptions:

1. The first heating period is 2 hours
2. The second heating period is 2½ hours
3. 1.5 parts of lauroyl peroxide are used as the curing catalyst A material which has a leathery appearance and which has a tensile strength of 545 p. s. i., a 300% elongation at break and a Shore hardness of 70 is obtained.

Example 24

820 parts of sebacic acid (4.0 mols)
300 parts of monoisopropanolamine (4.0 mols)
80 parts of ethylene glycol acid maleate (1.0 mol)

The sebacic acid and monoisopropanolamine are placed in a stainless steel kettle fitted with a mechanical agitator, and the kettle is heated at 200° C. in an oil bath while the charge is kept under an atmosphere of carbon dioxide. Heating is continued for 2 hours, the acid maleate is added, and heating is continued for 4¾ hours.

After the resin has cooled it is milled with 150% by weight of Mapico Red No. 297, an iron oxide pigment, until the pigment is thoroughly dispersed in the resin. 4% by weight of the resin of lauroyl peroxide is then added and milled with the pigmented resin until completely dispersed.

The milled stock is molded in a single cavity flash mold for 15 minutes at 90° C. at 500 lbs./in.² pressure to a stiff sheet having a tensile strength of 835 p. s. i. and one of 230 p. s. i. at 100% elongation and a 320% elongation at break.

Example 25

50 parts of the resin of Example 24 after the second heating period are milled with 30 parts of clay, 1 part of carbon black and 2 parts of lauroyl peroxide. Upon molding as in Example 24, a leathery-appearing material having a tensile strength of 615 lbs./in.² and a 290% elongation at break is obtained.

Example 26

50 parts of the resin of Example 24 after the second heating period are milled with 30 parts of clay, 1 part of carbon black, 0.5 part of stearic acid and 2 parts of lauroyl peroxide. After curing, a material having a tensile strength of 700 lbs./in.² and a 310% elongation at break is obtained.

Example 27

205 parts of sebacic acid (1.0 mol)
75 parts of monoisopropanolamine (1.0 mol)
43.5 parts of propylene glycol acid maleate (0.25 mol)

The procedure of Example 24 is followed with a 4-hour second heating period instead of 4¾ hours. The stiff material obtained after milling and curing has a tensile strength of 960 p. s. i. and one of 270 p. s. i. at 100% elongation, and a 340% elongation at break.

Example 28

94 parts of azelaic acid (0.5 mol)
37.5 parts of monoisopropanolamine (0.5 mol)
20 parts of ethylene glycol acid maleate (0.125 mol)

The procedure of Example 24 is followed with heating periods of 17 hours and 4 hours, respectively. Milling and curing in the usual manner produces a stiff material having the appearance of rubber.

Example 29

205 parts of sebacic acid (1.0 mol)
56.2 parts of monoisopropanolamine (0.75 mol)
14.0 parts of monoethanolamine (0.25 mol)
40 parts of ethylene glycol acid maleate (0.25 mol)

The procedure of Example 24 is followed, adding the monoethanolamine with the monoisopropanolamine and heating for 2 hours and 2½ hours, respectively. The stiff material obtained has a tensile strength of 1115 p. s. i. and a 230% elongation at break.

Typical physical properties of the cured materials of the present invention which have been reinforced with Mapico Red No. 297, an iron oxide pigment, varying the properties somewhat with the particular resin formulation, are:

| | |
|---|---|
| Tensile strength | 400–1000 p. s. i. |
| Modulus at 100% elongation | 200–500 p. s. i. |
| Elongation at break | 200–400% |
| Shore hardness | 40–90 |
| Tear resistance | 200 lbs./in. thickness |
| Brittle point | −8° to −17° C. |
| Dielectric strength at 25° C. | 300 volts per mil. |
| Dielectric constant | 24 at 500 volts and 60 cycles<br>5.5 at 1000 k. c. |
| Power factor | 0.27 at 500 volts and 60 cycles<br>0.06 at 1000 k. c. |
| Arc resistance | Superior to natural rubber and the butadiene copolymers |

Resist dry heat up to 150° C.
Not affected by exposure to air or sunlight.

Saturated aliphatic dicarboxylic acids which may be used in the present invention are those which do not form an anhydride upon heating. Acids having at least four carbon atoms between the two carboxyl groups are preferred. Examples of suitable acids are adipic acid, azelaic acid, sebacic acid, pimelic acid, brassylic acid, suberic acid, etc.

Monoalkylolamines which are suitable for condensation with a saturated aliphatic dicarboxylic acid to form a linear polyester-polyamide susceptible of cross-linking include monoethanolamine, propanolamine, isopropanolamine, the monobutanolamines, 2-amino-3-hexanol, 3-amino-4-heptanol, 2-amino-4-pentanol, 5-amino-4-octanol, 3-amino-3-methyl-2-butanol, 2-amino-2-methyl-3-hexanol, 2-amino-2-methyl-1-butanol, 3-amino-3-methyl-2-butanol, 3-amino-3-methyl-4-heptanol, 3-amino-2-methyl-4-heptanol, etc. Secondary amines such as N-alkyl, N-aryl and N-aralkyl monoalkylolamines may also be used. Examples are N-phenyl monoethanolamine, N-benzyl monoethanolamine, N-phenylethyl monoethanolamine, N-butyl monoethanolamine, N-methyl monoethanolamine, etc. Mixtures of two or more different monoalkylolamines may also be used, as evidenced by the foregoing examples.

Moreover, a small proportion of a polyfunctional (at least trifunctional) alkylolamine for example diethanolamine, polyamine for example diethylenetriamine, or polyhydric alcohol for example glycerol, may be incorporated with the reaction mixture.

Secondary amines or primary amines having a side-chain containing more than one carbon atom generally give the most rubbery products. Because of hydrogen bonding, primary alkylolamines having no side-chain or a side-chain containing only one carbon atom, such as monoethanolamine or monoisopropanolamine, give cured products which are less rubbery. We therefore prefer to use alkylolamines such as N-phenyl monoethanolamine or 2-amino-1-butanol in the first step of the process of the present invention, but it should be understood that the invention is not limited to this preferred embodiment. Moreover, up to about half of the N-phenyl monoethanolamine or 2-amino-1-butanol may be replaced by monoethanolamine without too much change in the modulus of the final cured product and, in fact, with an increase in the resistance of the product to swelling in aromatic hydrocarbons.

Esters of alpha,beta-unsaturated aliphatic dicarboxylic acids suitable for cross-linking of the linear polymers include glycol acid esters of maleic acid, itaconic acid, fumaric acid, citraconic acid, etc. These acids may be esterified with a glycol such as ethylene glycol, propylene glycol, butylene glycol, diethylene glycol, triethylene glycol, dipropylene glycol, etc., to produce the corresponding glycol acid esters. Ethylene glycol acid fumarate, diethylene glycol acid maleate, propylene glycol acid itaconate, propylene glycol acid fumarate, butylene glycol acid maleate, etc., are some examples of such esters. Particularly suitable are ethylene or propylene glycol acid maleates. Furthermore, a portion of the alpha,beta-unsaturated dicarboxylic acid may be replaced by a modifying acid such as sebacic acid, phthalic acid, adipic acid, etc.; for example, diethylene glycol acid fumarate-sebacate, dipropylene glycol acid maleate-adipate, etc., may be used to advantage.

The resins of the present invention are preferably prepared in a two-stage process, both stages of which may be carried out at temperatures between about 180° C. and 220° C. and preferably at about 200° C.

While we do not wish to be limited to any particular theory of mechanism of reaction, we believe that in the first reaction stage substantially equimolar proportions of monoalkylolamine and non-anhydride-forming dicarboxylic acid combine upon heating to form the corresponding amide. The amide, upon further heating, undergoes partial esterification and a linear polymer is built up:

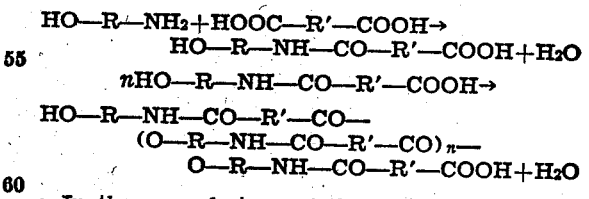

In the second stage of the process, a mixture of the linear polymer and a suitable glycol acid ester is heated until a resin of a definite viscosity (near the gel point) is obtained. This results in the formation of linear polymers of the polyamide-polyester and the glycol ester, said polymers containing the group

at intervals in the chain. These linear chains are cross-linked by heating with a small amount of an organic peroxide.

The reactions of the present process are advantageously carried out under reduced pressure. If desired, the reactants may be heated under atmospheric pressure for a time and then for a period under reduced pressures or the entire reaction may be carried out at atmospheric pressure, or the entire reaction may be carried out under reduced pressure. The time of reaction will, of course, depend on which alternative is selected, along with other factors such as the particular reactants involved, the size of the reaction batch, the amount of heat transfer, etc. In general we prefer to effect formation of the monomeric amide at atmospheric pressure and then conduct the remainder of the resin formation reaction under reduced pressures of from about 1–10 mm. mercury, but the invention is not limited to this preferred embodiment thereof. Moreover, to prevent oxidation, the reaction is preferably carried out in an inert atmosphere as, for example, one of nitrogen, carbon dioxide, etc.

The resin obtained upon reaction of saturated aliphatic dicarboxylic acid, monoalkylolamine and glycol acid ester according to the process of the present invention can be cured by heating with a small amount of an organic peroxide. If the resin is milled on a rubber mill with an appropriate reinforcing pigment and peroxide curing agent, the milled stock can be cured under heat and pressure in a rubber mold to yield a strong and elastic rubber-like product. Since the resins cure rapidly at relatively low temperatures and therefore have a tendency to cure prematurely during milling or to "scorch" on the mill, it is desirable to utilize cooling water in the milling rolls.

The milled stock may be cured in a rubber mold at 90°–120° C. and in 5–15 minutes at 500–1000 pounds pressure.

Examples of suitable curing catalysts include the acidic peroxides, for example, benzoyl peroxide, phthalic peroxide, succinic peroxide, benzoyl acetic peroxide; the fatty oil acid peroxides, for example, coconut oil acid peroxide, lauric peroxide, stearic peroxide; the alkyl peroxides, for example, tertiary butyl hydroperoxide; and the terpene peroxides, for example, ascaridole, etc. In general, the concentration of catalyst should be from about 1% to about 10% by weight of the resin.

It may be desirable to add a polymerization inhibitor to the resins of the present invention during their preparation to stabilize them and minimize the amount of scorching on the mill. Suitable inhibitors are, for example, hydroquinone, benzaldehyde, resorcinol, tannin, formaldehyde, sym. alpha,beta-naphthyl-p-phenylene diamine, ascorbic acid, isoascorbic acid, etc., in an amount equivalent to about 0.1%–1% by weight of the total weight of reaction mixture.

It is preferable that acid and alcohol-amine reactants be employed in approximately stoichiometrically equivalent proportions, but a slight excess of one of the reactants does not necessarily do any harm. In order to obtain products of the desired properties, it is essential that proportions of the reactants be carefully controlled, and we have found that rubber-like products can be obtained by reacting the saturated aliphatic dicarboxylic acid, the monoalkyloamine, and the glycol acid ester in a molar ratio of from about 1:1:0.15 to 1:1:0.3.

The materials of the present invention closely resemble rubber, lacking its resilience and high tensile strength and elongation. However, they are superior to natural rubber in their gasoline, grease and oil resistance, their resistance to deterioration by actinic light, heat and/or air, and their relatively short time of cure. These and other properties put our new rubber-like products in the class of a specialty product. As such, they have many uses as substitutes for rubber in more or less static applications. Some of these include the fabrication of jar rings, shoe soles and heels, gaskets, special tubing, printing and typewriter rolls, etc. In addition, they find application in many industrial fields including laminating, coating, impregnating, etc. For example, the products of the present invention, before curing, may be used as textile or fabric impregnants to produce, after curing of the impregnated material, water-repellent products.

The resins of the present invention may be mixed with rubber whereupon they act not only as anti-oxidants, plasticizers and a means of lowering both the viscosity and the power required during milling, but also as vulcanization accelerators. They may be mixed with ester gum and and various alkyd resins, particularly the oil-modified air-drying resins to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, either in solution or by admixture as solid resins.

Obviously, suitable fillers, dyes, and pigments may be mixed with the resins to modify the properties thereof as may be desirable. We have found that pigmenting of the resinous products of the present invention increases their tensile strength and any pigment may be incorporated with the resins to produce this effect. Some suitable pigments include iron oxides, carbon black, titanium dioxide, silicon dioxide, etc., as well as other pigments which of suitable size to act as reinforcing pigments. Due to absorption of peroxide by carbon black, it is usually preferably used in admixture with other pigments. Fillers other than pigments may also be incorporated with the resinous products of the present invention. These include wood flour, asbestos, calcium silicate, calcium carbonate, magnesium carbonate, talc, paper pulp, clay, glass filaments, mica, cotton flock, silica, etc.

When used in the present specification and claims, the term "rubber-like" is intended to cover products which may vary rather widely in appearance from rubber to leathery but which have in common the following properties: the products are essentially thermoset and cross-linked chemically, their tensile strengths are increased by pigmenting, they cannot be readily reprocessed such as by calendering or remolding after they have become thermoset, and they can be cured by heating in the presence of an organic peroxide catalyst.

We claim:

1. A rubber-like product obtained by heating at about 180°–220° C. a monoalkylolamine of the formula HO—Y—NHR in which Y is a divalent saturated hydrocarbon radical and R is selected from the group consisting of hydrogen and saturated hydrocarbon radicals with a saturated aliphatic hydrocarbon dicarboxylic acid which does not form an anhydride upon heating, reacting the product so obtained with a glycol acid ester of an alpha,beta-unsaturated aliphatic hydrocarbon dicarboxylic acid, the molar proportions of saturated acid to alkylolamine to glycol acid ester being from 1:1:0.15 to 1:1:0.3, and then curing the reaction product by heating in the presence of an organic peroxide catalyst.

2. A rubber-like product obtained by heating at about 180°–220° C. a monoalkylolamine of the formula HO—Y—NHR in which Y is a divalent saturated hydrocarbon radical and R is selected from the group consisting of hydrogen and saturated hydrocarbon radicals with a saturated aliphatic hydrocarbon dicarboxylic acid which does not form an anhydride upon heating, reacting the product so-obtained with a glycol acid ester of an alpha,beta-unsaturated aliphatic hydrocarbon dicarboxylic acid, the molar proportions of saturated acid to alkylolamine to glycol acid ester being from 1:1:0.15 to 1:1:0.3, milling the resin obtained with a pigment and an organic peroxide curing agent, and curing the milled resin by heating.

3. A product as in claim 2 in which the monoalkylolamine is N-phenyl monoethanolamine.

4. A product as in claim 2 in which the monoalkylolamine is 2-amino-1-butanol.

5. A product as in claim 2 in which the glycol acid ester is the condensation product of diethylene glycol, fumaric acid and sebacic acid in a molar ratio of 6:5:1 having an acid number of about 50.

6. A process of preparing a rubber-like material which comprises heating at about 180°–220° C. substantially equivalent molar proportions of a monoalkylolamine of the formula HO—Y—NHR in which Y is a divalent saturated hydrocarbon radical and R is selected from the group consisting of hydrogen and saturated hydrocarbon radicals and a saturated aliphatic hydrocarbon dicarboxylic acid which does not form an anhydride upon heating for a time at atmospheric pressure and for a time under reduced pressure, heating the product so obtained with a glycol acid ester of an alpha,beta-unsaturated aliphatic hydrocarbon dicarboxylic acid under reduced pressure, the molar ratio of saturated acid to monoalkylolamine to glycol acid ester being from 1:1:0.15 to 1:1:0.3, milling the resin obtained with a pigment and an organic peroxide curing agent, and curing the milled resin by heating.

DAVID W. JAYNE, JR.
HAROLD M. DAY.
EDWARD L. KROPA.

REFERENCES CITED

The following references are of record in the file of this patent:

UNITED STATES PATENTS

| Number | Name | Date |
| --- | --- | --- |
| 2,333,639 | Christ et al. | Nov. 9, 1943 |
| 2,363,581 | Frosch | Nov. 28, 1944 |
| 2,406,298 | King | Aug. 20, 1946 |